2,859,091
RECOVERY OF URANIUM FROM PITCHBLENDE ORES

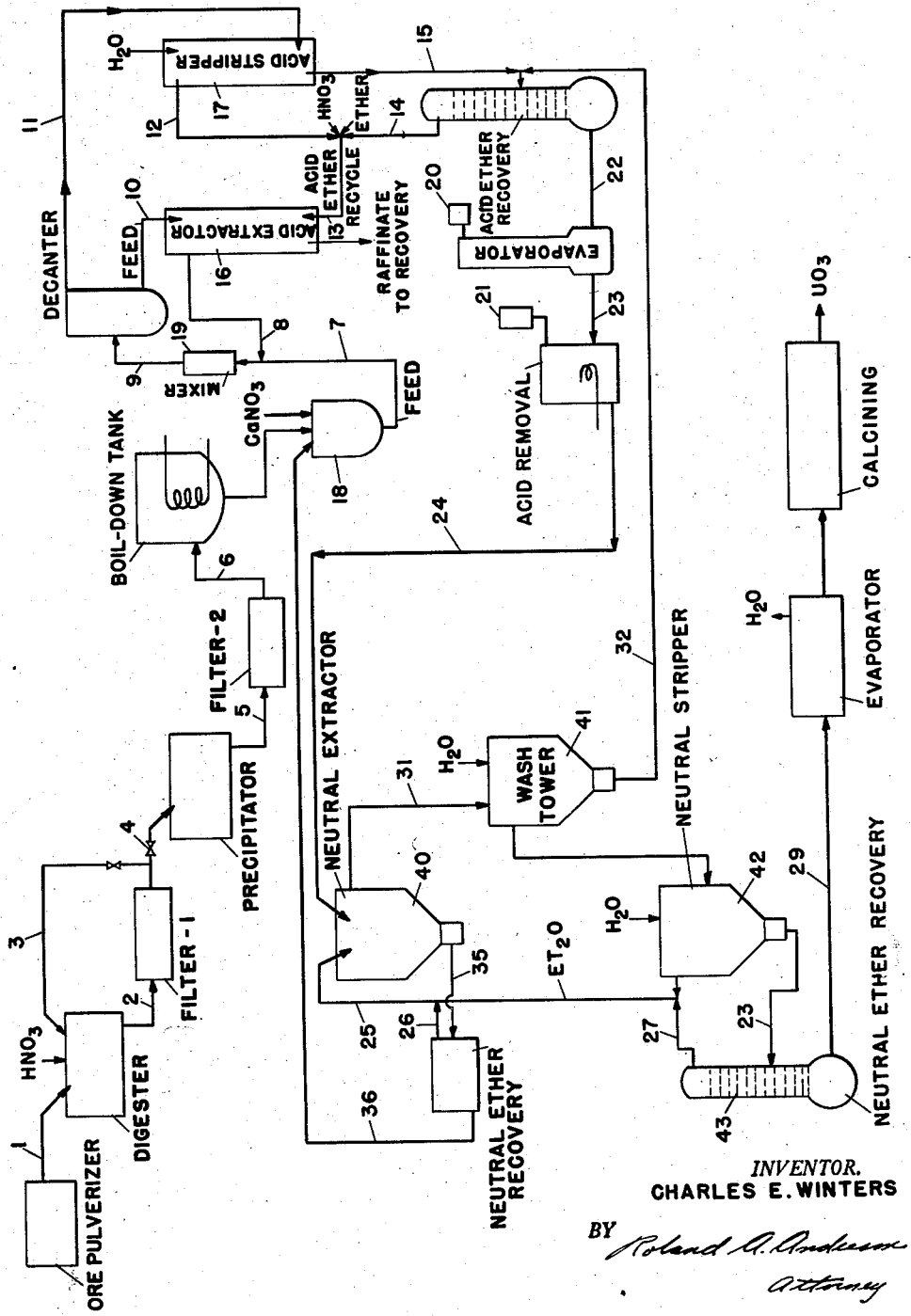

Charles E. Winters, Oak Ridge, Tenn.

Application August 8, 1950, Serial No. 178,266

5 Claims. (Cl. 23—14.5)

(Granted under Title 35, U. S. Code (1952), sec. 266)

The invention described by this patent application and any and all Letters Patent issued thereon may be manufactured and used by or for the Government for governmental purposes without the payment of any royalty fees to me whatsoever.

This invention relates to a semi-continuous method of recovering uranium of high purity from its ores.

The production of uranium of high degree of purity from its ores has heretofore been an involved and expensive process particularly in tonnage quantities. One of the principal difficulties encountered has been the expensive and time-consuming purification of the uranium required after the uranium in a particular ore has been concentrated by previously known procedures.

Accordingly, it is a primary object of this invention to provide an efficient and economical process for recovering uranium in tonnage quantities from its ores.

A more specific object of the invention is to provide a rapid and direct method of recovering uranium from its ores and simultaneously purifying it.

Other objects will appear hereinafter.

This invention makes use of the selective solubility of uranyl nitrate extracted from its ores by nitric acid in substantially hydrophobic organic solvents and particularly in ethers. In order to provide substantially complete recovery of the uranium in as short a time as possible the present invention provides, in one of its aspects, for the addition of a nitrate salt in relatively high concentration to the aqueous acid extract of the ore prior to the treatment of this aqueous extract with the selective organic solvent. As will be more fully pointed out hereafter the addition of this salting out agent improves the partition of the uranyl nitrate between the selective-solvent and aqueous phases to a degree that has made possible an extremely economical recovery method for substantially all the uranium contained in the ores treated.

In order to reduce to a minimum the quantity of the relatively expensive extractant needed in the process, the present invention, in another of its aspects, provides for the continuous recycling of the solvent used in a closed path to achieve continuous extraction of the uranyl nitrate in a portion of the path with virtually no loss of the organic solvent. The uranium values are stripped from the solvent in another portion of its path by bringing it into contact with water under such conditions that the uranyl nitrate is preferentially extracted from the solvent into a second aqueous phase. The solvent is continuously returned to the original extraction column where it is met with the aqueous ore extract to complete the cycle. Thus the uranium metal is won from its ores in the form of an aqueous solution of uranyl nitrate which may then be treated in any convenient manner to obtain the pure metal or a pure compound of the metal.

In a somewhat narrower sense, the present invention provides for the treatment of a uranium bearing ore with nitric acid to extract from the ore its uranium content in the form of aqueous uranyl nitrate. Since uranium ores as a result of natural nuclear decomposition contain lead and radium in addition, the acidic extract of the ore is treated with a soluble sulphate to precipitate lead sulphate. Radium sulphate, which is isomorphic with lead sulphate, is co-precipitated with the latter from which its separation may be accomplished far more readily than from the corresponding co-precipitate with barium sulphate. The acid insoluble material and lead sulphate are filtered from the solution, and a barium salt is added to remove excess sulphate and also any remaining radium by co-precipitation. After clarification to remove the barium sulphate, this solution is tested to determine its distribution coefficient, and a quantity of nitrate salt is added to raise the product of the distribution coefficient and the total nitrate ion normality at least to 20. The distribution coefficient is expressed as the ratio of the uranium concentration in the organic solvent to the concentration in the aqueous ore extract at equilibrium with an equal volume of the solvent. The aqueous solution of uranyl nitrate thus obtained is used as feed stock for the extractor. Because of its cheapness and availability diethyl ether is preferred in this process as the selective organic solvent.

The feed solution is then brought into contact with acidified solvent which extracts substantially all of the uranyl nitrate selectively from the incoming feed solution. The extract after suitable treatment is then stripped with water to obtain an aqueous solution of uranyl nitrate and the ether is recycled.

In processing ores containing more than a trace of molybdenum together with the uranium, a not infrequent occurrence, it is preferable in cases where molybdenum may be harmful to the final uranium product to purify the ethereal extract before stripping the uranyl nitrate from the ether layer. A case in point is the production of uranium hexafluoride to be used as a gas, since molybdenum hexafluoride is also a gas at moderate temperatures. The difficulty arises through the fact that molybdic acid obtained by treatment of the ore with nitric acid is extracted by ether along with the uranyl nitrate and thence is transferred to the aqueous uranyl nitrate obtained by stripping the ether. Several methods are available for the purification of the ethereal extract, such as chemical treatment of the ethereal extract to precipitate a molybdenum compound, adsorption of the molybdic acid on charcoal, etc. Each of these methods requires a relatively expensive batchwise treatment of the extract or of the final aqueous uranyl nitrate and as a result it is preferable to use a continuous process which will be known as the double-ether extraction. The double-ether extraction is so named because the process comprises two similar, preferably cyclic extractions of the uranyl nitrate by a selective solvent or solvents from aqueous solutions and stripping of the solvent solutions with water. The initial extraction is carried out preferably in acid media with the aid of a nitrate compound while the second extraction is carried out preferably at a relatively higher concentration with neutral media. In a preferred embodiment of this method, the acid feed solution for the initial extraction is obtained in the manner outlined above and the initial extraction with acidified ether is completed as already described. The initial ethereal extract is continuously stripped with water immediately thereafter to yield aqueous uranyl nitrate in a partially purified form and the stripped ether is recycled to the initial extraction. This aqueous solution is concentrated and de-acidified to yield a concentrated neutral aqueous solution of uranyl nitrate. The neutral uranyl nitrate solution containing relatively small amounts of impurities is brought into contact with neutral ether which extracts substantially all the uranyl nitrate. The neutral ether extract is then washed with a relatively small amount of water and thereafter stripped of its uranyl nitrate content with water, and the stripped neutral ether is recycled to be brought into contact with the concentrated neutral aqueous uranyl nitrate. From the final stripping of the neutral ether, aqueous uranyl nitrate is obtained in a highly purified state and free of molybdenum. This solution may be treated in any convenient manner such as crystallizing uranyl nitrate, precipitating the uranium as a salt or merely evaporating the solution substantially to dryness and roasting to obtain uranium trioxide which may be reduced to obtain the pure uranium metal.

It will be appreciated that the present invention provides a relatively simple and economical method for virtually complete recovery of uranium from its ores in an extremely pure state. The use of the salting out agent in the initiatl extraction step with an organic solvent makes feasible the rapid processing of tonnage quantities and reduces the required volume of ether to a minimum. When a suitable salting out agent, such as calcium nitrate is used, the distribution coefficient of the uranyl nitrate between the ether layer and the water layer is increased to values of many times the distribution coefficient of the uranyl nitrate when no salting out agent is employed, and the product of this coefficient and the total nitrate ion concentration is correspondingly increased. Recycling of the ether reduces the cost of the operation still further. In addition, recovery of the ether dissolved in ether-extracted water solutions may be employed to introduce further economies of operation.

The operation of this process will be more fully understood and its economy more fully appreciated by reference to the following specific example. The example is illustrated by the accompanying drawing which is a flow sheet showing diagrammatically the operation of one embodiment of the present invention employing the so-called double-ether extraction to obtain uranium trioxide from a pitchblende ore of which the following is a typical analysis on a weight basis.

TABLE I

*Ore analysis*

| | Percent |
|---|---|
| $U_3O_8$ | 69.0 |
| $SiO_2$ | 10.5 |
| PbO | 6.1 |
| CaO | 2.2 |
| MgO | 2.3 |
| $Al_2O_3$ | 1.5 |
| $SO_3$ | 1.3 |
| NiO | 1.0 |
| $Fe_2O_3$ | 0.9 |
| CoO | 0.4 |
| $P_2O_5$ | 0.09 |
| $MoO_3$ | 0.07 |
| CuO | 0.06 |
| MnO | 0.03 |
| $V_2O_5$ | 0.03 |
| Rare Earths and Th | 0.13 |

As shown in the flow sheet the ore is pulverized at least to 30 mesh and preferably to less than 65 mesh with a substantial portion being under 100 mesh. With dry ore this may be carried out conveniently in a ball mill of the continuous classifier type. The pulverized ore is fed to the digester through line 1, and concentrated nitric acid is added together with some recycled water which is obtained in a manner to be described hereinafter. The weight of acid used for treating this type of ore in excess of that required for solution of the metal values depends to a great extent on the amounts of molybdenum and phosphorus present. The weight of acid should be kept at as low a value as possible both for the sake of economy and because it is necessary to remove the nitric acid later in the process. The mixture of ore and acid is heated batchwise in the digester for a period of at least 3 to 4 hours at 95° C. to ensure complete solution of the uranium values.

The nitric acid dissolves not only the uranium and other metal values contained in the ore including molybdenum as molybdic acid, but also substantially all the lead and at least a portion of the radium content. Since it is desirable to recover the lead and radium from the ore solution, these are removed by adding a soluble sulphate, e. g., sodium sulphate, or preferably sulphuric acid, to the ore solution.

The separation of the lead and radium sulphates from the solution may be accomplished in at least two ways. In one method, referring again to the flow sheet, the digestion mixture of ore and nitric acid may be pumped through line 2 thence through filter #1 and returned via line 3 to the digester until the solution is clarified. To the clarified solution concentrated sulphuric acid is added, the quantity being preferably about 6.5 times the stoichiometric requirement for the precipitation of the total amount of lead. The precipitated lead sulphate carries with it the radium content of the solution, and these may be filtered from the solution by pumping them through line 2 and thence through the filter #1 into the precipitator. Alternatively, the sulphuric acid may be added directly to the digestion mixture of ore and nitric acid, and the gangue containing the ore insolubles together with the lead and radium sulphates may be then filtered from the solution. In the alternative procedure the filter cake is washed on the filter with a quantity of water equal to about 30% of the weight of the ore. The filter cake is then reslurried with a quantity of water approximately equal to the weight of the ore and again filtered and washed with a quantity of water equal to about 30% of the weight of the ore. The wash waters and filtrates are combined in the precipitator after flowing through line 4 while the filter cake is retained for recovery of radium and lead.

In order to remove the sulphate ion, a barium salt, preferably the carbonate, is added to the combined filtrate and wash waters. The quantity of the barium salt added is preferably equivalent to 90% of the stoichiometric requirement for the precipitation of the total weight of sulphuric acid added. The barium carbonate is preferably added as an aqueous slurry containing one part carbonate to two parts water by weight. The precipitation of the excess sulphate ion is preferably carried out at an elevated temperature, and the barium sulphate precipitate may be removed by means of a centrifuge or other convenient means designated on the flow sheet as filter #2. The barium sulphate filter cake is washed in place with a small amount of water, usually just sufficient to displace the water contained in the cake. To insure complete washing the sulphate cake is reslurried with water, refiltered and again washed. The wash waters and filtrates are combined by flowing through line 6 into a steam-heated boil-down tank.

The solution in the boil-down tank is evaporated until the boiling point of the solution reaches about 118° C. which corresponds to about 6 mols of water per mol of uranyl nitrate. The solution is then flowed into the feed tank 18 to which is added the raffinate from the second extraction column for recovery of the uranyl nitrate contained therein as described hereinafter. The distribution coefficient of uranyl nitrate between ether and this solution is determined, and sufficient calcium nitrate is added to raise the overall extraction coefficient to a value in excess of 200. With a pitchblende ore containing about 65% $U_3O_8$ by weight, the addition of about 200 grams of anhydrous calcium nitrate per liter of solution raises the product of distribution coefficient and total nitrate ion normality to a value in excess of 20 and gives an extraction efficiency of over 99%. In general, the amount of the nitrate salt added will depend upon the concentration of metallic nitrate salts carried through to this point. The calcium nitrate is added as a concentrated solution, and the nitric acid concentration of the solution is adjusted to 0.5 normal. To lower the acid concentration lime may be added, whereas additional nitric acid may be added to raise the concentration. The feed solution may contain approximately 25–30 percent uranyl nitrate by weight with approximately 10–15 percent by weight of calcium nitrate and about 50 percent water by weight. The specific gravity of the feed solution is generally above about 1.4 and less than about 1.7. This solution is thoroughly agitated in the mixer 19 with the acidic ether extract from the acid extraction column 16 to saturate the aqueous solution with ether. The solution and ether mixture is then flowed through line 9 into a decanter which also serves as a feed storage. The ether is decanted from the feed solution and the latter is piped continuously through line 10 to the acid extraction column.

The acid extraction is preferably carried out in a packed column containing, for example, Raschig rings, Berl saddles, Lucite packing or the like. In general, about 7.4 theoretical plates are necessary for the extraction of about 99.5% of the uranium values. The feed solution flows downward through the packed column 16 where it is met with recycled acid ether with the ratio of feed to ether being approximately 1:1 by weight. The ether, fed to the column 16 through line 13 is preferably 1.0 normal in nitric acid to prevent extraction of the nitric acid from the feed solution with resultant precipitation of various basic compounds in the packed column. The extraction is wholly continuous with the aqueous feed entering from the decanter and the acidic ether through the recycle line 13 to which make-up ether is added to replace any losses. The extraction is carried out at about 20° C. to minimize ether loss through evaporation. The raffinate obtained from the acid extraction column may be subjected to further treatment to recover most of the calcium nitrate and any remaining uranium in a manner to be more particularly described hereinafter.

The acidic ethereal solution of uranyl nitrate after its contact with the feed solution is fed from the decanter through line 11 to a second packed column 17, similar in construction to the acid extraction column 16. In column 17, which will be referred to as the acid stripper, the ether is brought into contact with distilled or deionized water which is fed to the top of column 17, the ethereal solution being fed into the bottom of the column. The water strips the uranium values from the ether, leaving in the ether generally less than 0.1% by weight nitric acid and uranyl nitrate combined. The stripped ether is then recycled through lines 12 and 13 to the acid extraction column 16. It has been found desirable to use a quantity of water in the acid stripper equivalent to about 1.13 times the weight of ethereal solution. In general, it is desirable to use as little water as possible in this step for reasons which will become apparent hereinafter. The aqueous uranyl nitrate solution obtained contains around 5 percent ether by weight dissolved in it.

The water solution obtained from the stripping column 17 is fed through line 15 into an ether recovery column which may be of the sieve-plate distillation type. In the acid ether recovery column the ether dissolved in the aqueous uranyl nitrate solution is distilled off and recycled through lines 14 and 13 into the acidic extraction column 16. The aqueous uranyl nitrate solution is then pumped into an evaporator through line 22 where it is concentrated until the molar ratio of water to uranyl nitrate is roughly 6. The water condensed from this evaporation is preferably recovered, as by condenser 20, since it contains a considerable concentration of nitric acid, which is reused in a manner described below.

After evaporation, the uranyl nitrate solution which is kept from crystallizing at about 60 to 65° C. is pumped through line 23 to a tank containing a steam sparge line, and steam is blown through the hot solution until it is substantially free of nitric acid. The acid thus stripped from this solution may be recovered by any convenient means, such as a water cooled condenser 21, and it too may be reused, as in the ore digestion.

The concentrated solution is then pumped through line 24 to the neutral extractor 40 where it is met with a stream of neutral ether entering the extractor through line 25. The two streams are impinged upon one another in a weight ratio of about 1:1 and the resultant mixture allowed to separate into two phases. The ether extracts virtually all uranyl nitrate as the anhydrous salt and the ether phase is decanted through line 31 to a spray tower 41 for washing. The raffinate from the neutral extractor is subjected to recovery of ether after flowing through line 35. The recovered ether is returned to the neutral ether stream 25 by means of line 26, while the remaining water, containing a small but appreciable quantity of uranyl nitrate, is recirculated to the feed tank 18 through line 36 for recovery of the uranyl nitrate.

The ethereal extract obtained in the neutral extractor 40 is washed with water in a spray column 41, and the weight of wash water used is approximately 10% of the weight of the ether. After decanting, this wash water is pumped through line 32 to the acid ether recovery column where it is mixed with the aqueous solution of uranyl nitrate obtained from the acid stripper 17.

The washed neutral ethereal solution of uranyl nitrate is stripped of its uranium values with distilled water in a spray column 42, preferably using 1.1 to 1.2 pounds of water per pound of ether. The ether layer obtained here is decanted from the water layer, and the ether is recycled to the neutral extractor through line 25, while the water layer, containing about 99.9% of the uranyl nitrate originally in the ether solution, is pumped through line 25 to a bubble-cap distillation column 43 for recovery of the neutral ether. The water solution entering the bubble-cap column 43 contains approximately 20–25 percent uranyl nitrate, together with about 8% nitric acid and 6% ether by weight. The ether removed from this solution is returned via line 27 to the main stream of recycled neutral ether, line 25.

After removal of ether from this last aqueous uranyl nitrate solution, the solution is pumped through line 29 to a group of steam-heated evaporation tanks where a major portion of the water is removed to leave about 6 moles of water per mole of uranyl nitrate. This solution contains about 0.6 mole of nitric acid per mole of uranyl nitrate, and at this point has less than 0.1% of metallic impurities by weight. The solution is pumped into gas fired, stainless steel pots where it is calcined to yield extremely pure, molybdenum-free uranium trioxide.

The raffinate obtained from the acid extraction column is also subjected to a recovery treatment since it contains generally a large amount of calcium nitrate and a small amount of uranium. This solution is heated to remove dissolved ether and evaporated to remove a portion of the water from the solution. The solution is then steam sparged to remove nitric acid which is recovered, and 50% milk of lime is added to the solution to precipitate calcium uranate and to neutralize the remainder of the nitric acid. The precipitation is carried out using 15% excess calcium hydrate and the calcium uranate is filtered from the solution and retained. The filtrate is evaporated further and cooled to about 0° C. to crystallize calcium nitrate. The crystallized calcium nitrate is removed from the mother liquor, for example, by centrifuging, and may be used in making up the feed solution for the acid extraction.

In the embodiment just described, it will be realized, every provision is made for recovering substantially all the uranium entering the process in the ore. The addition of the soluble nitrate salt to the aqueous acid extract of the ore reduces to a minimum the volume of the selective organic solvent necessary to obtain virtually complete extraction of the uranyl nitrate. The recycling of the solvent introduces further great economies since no large scale distillations are required. In the embodiment, as was pointed out, further economies are made possible by the recovery of the ether dissolved in the various aqueous solutions, by the recovery of a considerable portion of the nitrate salt employed, and by recovery of at least part of the nitric acid employed in the process.

Although the invention has been described with reference to a particular ore, it will be realized that the method is applicable to other uranium-bearing ores as well. It is desirable however, for the sake of economy, to use a raw material high in uranium values, the reason for this being the large amounts of nitric acid required to neutralize the gangue materials and the necessity for concentrating the solutions after the acid digestion in order to make the extraction more feasible. However, an ore concentrate may be used in the process.

In the description reference was made to various types of equipment which might be used for the specific purposes described. It will be appreciated that any equivalent apparatus may be used for the same purposes. It should be borne in mind however that at various points in the process radioactive materials are handled and as a result it will be desirable to employ continuous equipment. For example, during the various filtrations continuous rotary filters or centrifuges may be used to remove the precipitates from the solution. With respect to the salting-out agent, although it is preferred to use calcium nitrate on the basis of its relative cheapness and the relatively large increase in extraction coefficient which is obtained through its use, it is entirely possible to use other metal nitrates such as aluminum, copper, zinc, etc. It will be noted that in the process various metal nitrates may be carried through to the acid extraction step, and it is for this reason that it is desirable to determine the distribution coefficient of the solution first without the deliberately added metal nitrate. Advantage may then be taken of the metal nitrates carried through to this point from the ore digestion to reduce the amount of additional metal nitrate needed to obtain the requisite efficiency. The amount of the metal nitrate added to raise the product of the distribution coefficient and the total nitrate ion normality to the desired value may be determined on a statistical basis as a function of the concentration of nitrates other than uranyl nitrate in the solution prior to the addition of the salting-out agent.

In addition to the diethyl ether solvent, various other selective solvents and mixtures may be used. Some of these are: methyl isobutyl ketone, dibutyl Carbitol, diethyl Celluosolve and various other ethers, alcohols, and ketones and mixtures thereof which are substantially immiscible in the aqueous solution of uranyl nitrate. Similarly, the various ratios of solvent to solution described in the embodiment may vary depending on the desired extraction efficiency and, in general, upon considerations of economy.

In molybdenum-bearing ores, as has already been noted, the double ether extraction is preferred. However, in ores containing substantially no materials tending to follow the uranium through the present process or where small amounts of these extraneous materials are not considered undesirable, a single extraction is usually sufficient. This may be conveniently accomplished by adding the salting-out agent to the aqueous ore extract in the manner already described and extracting the uranyl nitrate from the aqueous ore extract by means of a selective organic solvent which is substantially water-immiscible. The solution of the uranyl nitrate in the selective solvent is then washed with a relatively small amount of water and the solvent is stripped of its uranium content with water. The solvent is then recirculated to the extraction and the product of this relatively simple process is pure aqueous solution of uranyl nitrate. It is necessary, however, when molybdenum is present in the ore to use the double-ether extraction. Still other alternatives will be apparent to those skilled in the art.

Since many embodiments might be made of the present invention and since many changes might be made in the embodiment described, it is to be understood that the foregoing description is to be interpreted as illustrative only and not in a limiting sense.

I claim:

1. A method of recovering uranium from a pitchblende ore which comprises digesting said ore with aqueous nitric acid to obtain an aqueous solution containing uranyl nitrate, extraneous impurities, and an insoluble gangue, adding a soluble sulphate to said solution, separating said gangue and the resulting insoluble sulphates from the resulting solution, adding an acid-soluble barium salt to the resulting separated solution, separating the resulting barium sulphate precipitate from the resulting supernatant solution, dissolving a metal nitrate in relatively high concentration in the resulting separated supernatant solution, circulating a stream of a substantially water-immiscible, selective, organic solvent in a closed path, contacting said solvent stream in a portion of its path with the resulting solution containing said metal nitrate to preferentially extract the uranium from said solution, stripping the resulting uranium-containing stream of organic solvent with water in another portion of its path to recover the uranium in aqueous solution, and recycling the resulting stripped organic solvent to said first portion of its path for contact with said solution containing said metal nitrate.

2. A method of recovering substantially pure uranium values from ores containing uranium, lead and radium which comprises digesting the ore at an elevated temperature with excess aqueous nitric acid to obtain an aqueous acidic solution containing uranyl nitrate and an insoluble gangue, adding a soluble sulphate to said solution, separating said gangue and the resulting lead and radium sulphates from the resulting solution, adding an acid-soluble barium salt to the resulting separated solution, separating the resulting barium sulphate from the resulting supernatant solution, dissolving a metal nitrate in the resulting separated supernatant solution in sufficient quantity to raise the product of the distribution co-efficient of uranyl nitrate between a substantially water immiscible, selective organic solvent and the resulting metal nitrate solution and the total nitrate ion normality to a value in excess of 20, acidifying said organic solvent, extracting the uranyl nitrate from the resulting metal nitrate solution with said acidified solvent, separating the resulting acidic, uranium-containing, solvent phase from the resulting impurity-containing aqueous phase, stripping said solvent phase with water to recover the uranyl nitrate in an aqueous acidic solution, neutralizing the resulting aqueous, acidic, uranyl nitrate solution, extracting the uranium from said neutralized solution with a neutral, substantially water-immiscible, selective organic solvent, separating the resulting uranium-containing organic-solvent phase from the resulting aqueous phase and stripping the resulting solvent phase with water to recover the uranyl nitrate in an aqueous solution.

3. A method of recovering uranium from an aqueous nitric acid solution containing uranium and extraneous impurities including molybdenum which comprises dissolving a metal nitrate in relatively high concentration in said solution, circulating a stream of a substantially water-immiscible selective organic solvent in a closed path, contacting said solvent stream in a portion of its path with the resulting metal nitrate solution to preferentially extract uranium therefrom, stripping the resulting uranium-containing stream of organic solvent with water in another portion of its path to recover the uranium in an aqueous solution, recycling the stripped organic solvent to said first portion of its path for contact with said metal nitrate solution, neutralizing and concentrating the resulting aqueous uranium solution, circulating a second stream of a substantially water-immiscible selective organic solvent in a closed path, contacting said second solvent stream in a portion of its path with the resulting neutralized and concentrated aqueous uranium solution to preferentially extract uranium therefrom, stripping the resulting second uranium-containing stream of organic solvent with water in another portion of its path to recover relatively pure and substantially molybdenum-free uranium in an aqueous solution, and recycling the resulting second stripped organic solvent to said first portion of its path for contact with said neutralized and concentrated solution.

4. A method of recovering uranium from pitchblende ores containing extraneous impurities including lead, radium and molybdenum which comprises digesting the ore at a temperature of approximately 100° C. with excess aqueous nitric acid, separating the resulting insoluble gangue from the resulting solution, adding sulfuric acid to said solution, separating the resulting lead, radium and other insoluble sulphates from the resulting supernatant solution, adding barium carbonate to the separated supernatant solution, separating the resulting barium sulphate precipitate from the resulting second supernatant solution, adding calcium nitrate to the separated, second supernatant solution in sufficient quantity to raise the product of the distribution co-efficient of uranyl nitrate between diethyl ether and the resulting calcium nitrate solution and the total nitrate ion normality to a value in excess of 20, circulating an acidified first stream of diethyl ether in a closed path, contacting said first stream in a portion of its path with the resulting calcium nitrate solution, stripping the resulting acidic, uranium-containing first stream of diethyl ether with water in another portion of its path to obtain an aqueous acidic solution containing uranium and molybdenum, neutralizing and concentrating said acidic solution, recycling the resulting stripped first stream to the first portion of its path for contact with said calcium nitrate solution, circulating a second stream of diethyl ether in a closed path, contacting said second stream in a portion of its path with said neutralized and concentrated solution to preferentially extract uranium from said solution, stripping the resulting uranium-containing second stream of diethyl ether with water in another portion of its path to recover relatively pure and substantially molybdenum-free uranium in an aqueous solution, and recycling the stripped second stream to the first portion of its path for contact with said neutralized and concentrated solution.

5. A method of recovering uranium from an aqueous nitric acid solution containing extraneous impurities, a major portion thereof consisting of lead, which comprises adding a soluble sulfate to said solution, separating the resulting precipitate from the resulting supernatant solution, adding an acid-soluble barium salt to the resulting separated supernatant solution, separating the resulting precipitate from the resulting supernatant solution, dissolving a metal nitrate in relatively high concentration in the resulting separated supernatant solution, circulating a stream of a substantially water-immiscible, selective, organic solvent in a closed path, contacting said solvent stream in a portion of its path with the resulting solution containing said metal nitrate to preferentially extract the uranium from said solution, stripping the resulting uranium-containing stream of organic solvent with water in another portion of its path to recover the uranium in aqueous solution, and recycling the resulting stripped organic solvent to said first portion of its path for contact with said solution containing said metal nitrate.

References Cited in the file of this patent

UNITED STATES PATENTS

| 1,165,693 | Moore | Dec. 28, 1915 |
| 2,227,833 | Hixson et al. | Jan. 7, 1941 |
| 2,506,945 | Thomas et al. | May 9, 1950 |

FOREIGN PATENTS

| 1,220 | Great Britain | of 1882 |

OTHER REFERENCES

Glueckauf et al.: Journal of the Chemical Society (London), 1949, Part V, pp. S. 299–S. 302 inc. Paper read March 29, 1949.